United States Patent
Krovetz et al.

(10) Patent No.: US 9,208,145 B2
(45) Date of Patent: Dec. 8, 2015

(54) COMPUTER-IMPLEMENTED SYSTEMS AND METHODS FOR NON-MONOTONIC RECOGNITION OF PHRASAL TERMS

(71) Applicant: Educational Testing Service, Princeton, NJ (US)

(72) Inventors: Robert Krovetz, Hillsborough, NJ (US); Paul Deane, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 173 days.

(21) Appl. No.: 13/827,174

(22) Filed: Mar. 14, 2013

(65) Prior Publication Data
US 2013/0297294 A1 Nov. 7, 2013

Related U.S. Application Data (60) Provisional application No. 61/643,664, filed on May 7, 2012.

(51) Int. Cl.
G06F 17/21 (2006.01)
G06F 17/27 (2006.01)

(52) U.S. Cl.
CPC ............ *G06F 17/2775* (2013.01); *G06F 17/21* (2013.01)

(58) Field of Classification Search
CPC ........................... G06F 17/2775; G06F 17/278
USPC .................................................... 704/1, 9, 10
See application file for complete search history.

(56) References Cited

U.S. PATENT DOCUMENTS

| | | | | |
|---|---|---|---|---|
| 5,819,265 | A * | 10/1998 | Ravin et al. | 1/1 |
| 2005/0222837 | A1 * | 10/2005 | Deane | 704/4 |
| 2007/0067157 | A1 * | 3/2007 | Kaku et al. | 704/10 |
| 2010/0250238 | A1 * | 9/2010 | Deane | 704/9 |
| 2010/0305942 | A1 * | 12/2010 | Chaney et al. | 704/9 |
| 2011/0035211 | A1 * | 2/2011 | Eden | 704/10 |
| 2011/0195384 | A1 * | 8/2011 | Palacios | 434/157 |

OTHER PUBLICATIONS

Church, Kenneth, Hanks, Patrick; Word Association Norms, Mutual Information, and Lexicography; Computational Linguistics, 16(1); pp. 22-29; 1990.
Cowie, A.P.; Phraseology: Theory, Analysis, and Applications; Oxford University Press; 1998.
Deane, Paul; A Nonparametric Method for Extraction of Candidate Phrasal Terms; Proceedings of the 43rd Annual Meeting of the Association for Computational Linguistics; pp. 605-613; 2005.
Dunning, Ted; Accurate Methods for the Statistics of Surprise and Coincidence; Computational Linguistics, 19(1); pp. 65-74; 1993.
Fellbaum, Christiane; WordNet: An Electronic Lexical Database; MIT Press; 1998.

(Continued)

*Primary Examiner* — Douglas Godbold
(74) *Attorney, Agent, or Firm* — Jones Day (57) ABSTRACT

Systems and methods are provided for non-monotonic recognition of phrasal terms. Phrasal terms are identified from a corpus of written materials and ranked based on, for example, a mutual rank ratio. The phrasal terms are sequentially selected and a determination is made as to whether to accept or reject the selected phrasal term based on at least one predetermined criteria. The ranking of the phrasal terms may also rely on linguistic support to reduce duplication of phrasal terms and to distinguish different confidence levels for identified and accepted phrasal terms.

18 Claims, 4 Drawing Sheets

(56) References Cited

OTHER PUBLICATIONS

Finkel, Jenny, Grenager, Trond, Manning, Christopher; Incorporating Non-Local Information into Information Extraction Systems by Gibbs Sampling; Proceedings of the Association for Computational Linguistics; pp. 363-370; 2005.

Justeson, John, Katz, Slava; Technical Terminology: Some Linguistic Properties and an Algorithm for Identification in Text; Natural Language Engineering, 1(1); pp. 9-27; 1995.

Krovetz, Robert; Viewing Morphology as an Inference Process; Proceedings of the ACM-SIGIR Conference on Research and Development in Information Retrieval; pp. 191-202; 1993.

Krovetz, Robert, Deane, Paul, Madnani, Nitin; The Web is not a PERSON, Berners-Lee is not an ORGANIZATION, and African-Americans are not LOCATIONS: An Analysis of the Performance of Named-Entity Recognition; Proceedings of the ACL Workshop on Multi-Word Expressions: From Parsing and Generation to the Real World; pp. 57-64; 2011.

Maynard, Diana, Ananiadou, Sophia; Trucks: A Model of Automatic Multi-Word Term Recognition; Journal of Natural Language Processing, 8(1); pp. 2001.

Michelbacher, Lukas, Kothari, Alok, Forst, Martin, Lioma, Christina, Schutze, Hinrich; A Cascaded Classification Approach to Semantic Head Recognition; Proceedings of the 2011 Conference on Empirical Methods in Natural Language Processing; pp. 793-803; 2011.

Moon, Rosamund; Frequencies and Forms of Phrasal Lexemes in English; Ch. 4 in Phraseology: Theory, Analysis, and Applications, A. Cowie (Ed.); pp. 79-100; 1998.

Pecina, Pavel; Lexical Association Measures and Collocation Extraction; Language Resources and Evaluation, 44 (1-2); pp. 138-158; 2010.

Ratinov, Lev, Roth, Dan; Design Challenges and Misconceptions in Named Entity Recognition; Proceedings of the 13th Conference on Computational Natural Language Learning (CoNLL); pp. 147-155; 2009.

Schone, Patrick, Jurafsky, Daniel; Is Knowledge-Free Induction of Multiword Unit Dictionary Headwords a Solved Problem?; Proceedings of the Conference on Empirical Methods in Natural Language Processing; pp. 100-108; 2001.

Seretan, Violeta; Syntax-Based Collocation Extraction; Springer; 2011.

Smadja, Frank; Retrieving Collocations from Text: XTRACT; Computational Linguistics, 19(1); pp. 143-177; 1993.

Smith, F., Devine, K.; Storing and Retrieving Word Phrases; Information Processing and Management, 21(3); pp. 215-224; 1985.

Tsvetkov, Yulia, Wintner, Shuly; Identification of Multi-Word Expressions by Combining Multiple Linguistic Information Sources; Proceedings of the 2011 Conference on Empirical Methods in Natural Language Processing; 2011.

\* cited by examiner

COMPUTER-IMPLEMENTED SYSTEMS AND METHODS FOR NON-MONOTONIC RECOGNITION OF PHRASAL TERMS

CROSS-REFERENCE TO RELATED APPLICATIONS

This application claims the benefit of U.S. Provisional Application No. 61/643,664 filed on May 7, 2012. This application is also related to U.S. Pat. No. 8,078,452 issued on Dec. 13, 2011. The entire contents of each of these documents are incorporated herein by reference.

TECHNICAL FIELD

This document relates generally to recognizing phrasal terms and more particularly to computer-implemented systems and methods for non-monotonic recognition of phrasal terms.

BACKGROUND

The ordinary vocabulary of a language like English contains thousands of phrasal terms. A phrasal term is a multi-word lexical unit, such as a compound noun, a technical term, a phrasal verb, a named entity, an idiomatic phrase, a fixed collocation, and others. The exact number of phrasal terms is difficult to determine because new phrasal terms are coined regularly. Moreover, it is sometimes difficult to determine whether a phrase is a phrasal term or a regular, compositional expression (i.e., a phrase that can be understood by understanding the meaning of the component words). Accurate identification of phrasal terms is important in a variety of contexts, including natural language processing, question answering systems, information retrieval systems, and the like.

SUMMARY

In accordance with the teachings herein, systems and methods are provided for recognizing phrasal terms. For example, a computer implemented method for non-monotonically recognizing phrasal terms may include identifying a plurality of phrasal terms from a corpus of written materials. The plurality of phrasal terms may be ranked using for example, a mutual rank ratio. The plurality of phrasal terms may be sequentially selected and, for the selected phrasal term, a determination may be made regarding whether to accept or reject the selected phrasal term. The determination may be based on one or more predetermined criteria.

As another example, a system for non-monotonically recognizing phrasal terms may include one or more data processors and one or more computer readable mediums encoded with instructions for commanding the one or more data processors to perform processing steps. In the steps, a plurality of phrasal terms may be identified from a corpus of written materials and the plurality of phrasal terms may be ranked. As an example, the ranking may be performed by a statistical model such as a mutual rank ratio. The plurality of phrasal terms may be sequentially selected and, for the selected phrasal term, a determination may be made regarding whether to accept or reject the selected phrasal term. The determination may be based on one or more predetermined criteria.

As a further example, a computer readable medium may be encoded with instructions for commanding one or more data processors to perform processing steps. In the steps, a plurality of phrasal terms may be identified from a corpus of written materials and the plurality of phrasal terms may be ranked. As an example, the ranking may be performed by a statistical model such as a mutual rank ratio. The plurality of phrasal terms may be sequentially selected and, for the selected phrasal term, a determination may be made regarding whether to accept or reject the selected phrasal term. The determination may be based on one or more predetermined criteria.

As an example, the determination regarding whether to accept or reject the selected phrasal term may be made using any of numerous predetermined criteria. For example, the predetermined criteria may include rejecting the selected phrasal term if the selected phrasal term begins with or ends with a closed class word, rejecting the selected phrasal term if the selected phrasal term begins with or ends with a single letter, and/or rejecting the selected phrasal term if any term within the selected phrasal term is non-alphabetic, unless the term is non-alphabetic as a result of, for example, a hyphen or apostrophe. The predetermined criteria may also include rejecting the selected phrasal term if the selected phrasal term is a variation of a previously accepted phrasal term (variations may comprise plural forms, hyphenated forms, and/or closed compound forms). The predetermined criteria may also include replacing a previously accepted phrasal term with the selected phrasal term if the previously accepted phrasal term is a component of the selected phrasal term and the frequency of the previously accepted phrasal term and the selected phrasal term are the same, and/or rejecting the selected phrasal term if the selected phrasal term is a component of the previously accepted phrasal term and the frequency of the previously accepted phrasal term and the selected phrasal term are the same.

DETAILED DESCRIPTION

As discussed above, a phrasal term is a multi-word lexical unit, such as a compound noun, a technical term, a phrasal verb, a named entity, an idiomatic phrase, a fixed collocation, and others. As used herein, a phrasal term may also be referred to as a lexical phrase, a multi-word expression, or an n-gram. The identification of phrasal terms may be useful for improving a tokenization process. In particular, tokenization generally involves breaking up a corpus of written materials (e.g., text) into meaningful elements called tokens. The tokens may be used in further processing. In some case, meaningful tokens may include phrasal terms.

In an example, recognition of phrasal terms can be based on statistical and/or categorical association. The phrasal terms may be identified and then ranked based on a statistical model. For example, the statistical model may be a mutual rank ratio model. The ranking may further involve the use of linguistic support. Generally, the phrasal terms may be tentatively accepted based on the identification and ranking processes but then rejected or replaced after obtaining further information about the phrasal terms. The process may be referred to as a non-monotonic recognition since additional knowledge about the identified phrasal terms results in a reduction in the quantity of phrasal terms that are ultimately accepted.

There are numerous different types of phrasal terms. For example, the phrasal term may be a compound noun (e.g., hot dog or green card), a technical term (e.g., monoamine oxidase), a phrasal verb (e.g., comb through or set up), a named entity (e.g., Abraham Lincoln or San Francisco), an idiomatic phrase (e.g., kick the bucket or red herring), and a fixed collocation (e.g., prim and proper). Examples of the systems and methods discussed herein may be applied to any and/or all of these types of phrasal terms.

In accordance with the teachings herein, systems and methods are provided for recognizing phrasal terms. For example, a computer implemented method for non-monotonically recognizing phrasal terms may include identifying a plurality of phrasal terms from a corpus of written materials. The plurality of phrasal terms may be ranked using for example, a mutual rank ratio. The plurality of phrasal terms may be sequentially selected and, for the selected phrasal term, a determination may be made regarding whether to accept or reject the selected phrasal term. The determination may be based on one or more predetermined criteria.

Figure 1:
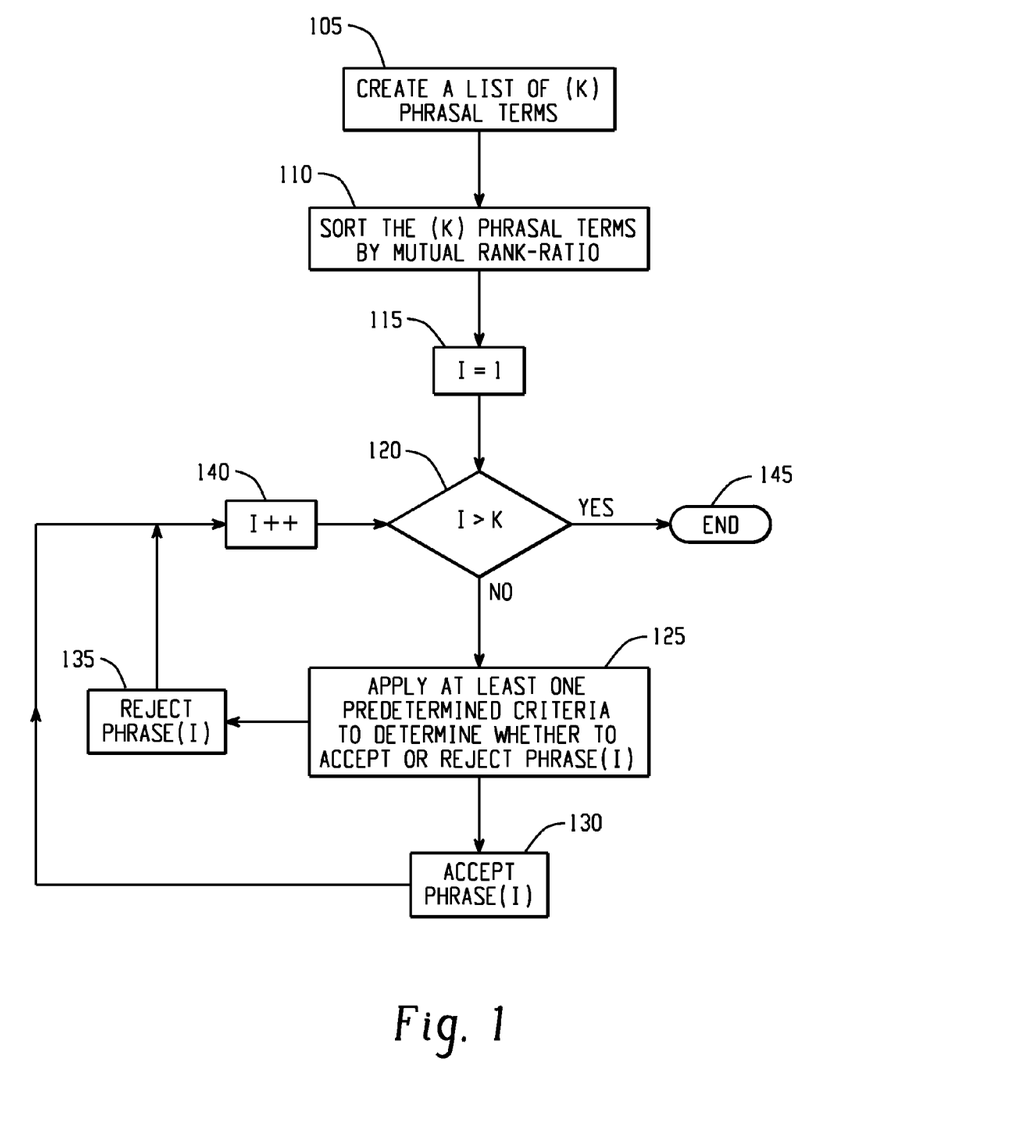
FIG. 1 is a flow diagram illustrating an example of a method for recognizing phrasal terms.

FIG. 1 is a flow diagram illustrating another example of a method for recognizing phrasal terms. As shown in FIG. 1, a list of (K) phrasal terms may initially be identified and/or created 105. After the list of phrasal terms is created 105, the (K) phrasal terms are sorted 110. For example, the phrasal terms may be sorted by frequency of occurrence or according to a statistical model. For example, the statistical model may be the use of a mutual rank ratio. Once the (K) phrasal terms are ranked 110, the phrasal terms may be individually examined to determine 125 whether to accept or reject the phrasal term tentatively identified earlier 105. For example, the determination may be made by applying at least one predetermined criteria to the phrasal term, phrase(I). For example, as illustrated in FIG. 1, the process may implement a loop logic (e.g., a for loop, a while loop, or an if loop) 115, 120, 140. In particular, the loop logic may initiate a variable (I) to an initial value (1) 115 and then for as long as (I) is less than or equal to (K), sequentially examine the (I)th phrasal term. After the (I)th phrasal term is examined the phrasal term is either accepted 130 or rejected 135 and (I) is incremented 140 so the next phrasal term can be examined.

The examination of the phrasal term to determine 125 whether to accept or reject the phrasal term may be based on one or more predetermined criteria. Some examples of such criteria are illustrated in the more detailed example illustrated in FIG. 2.

Figure 2:
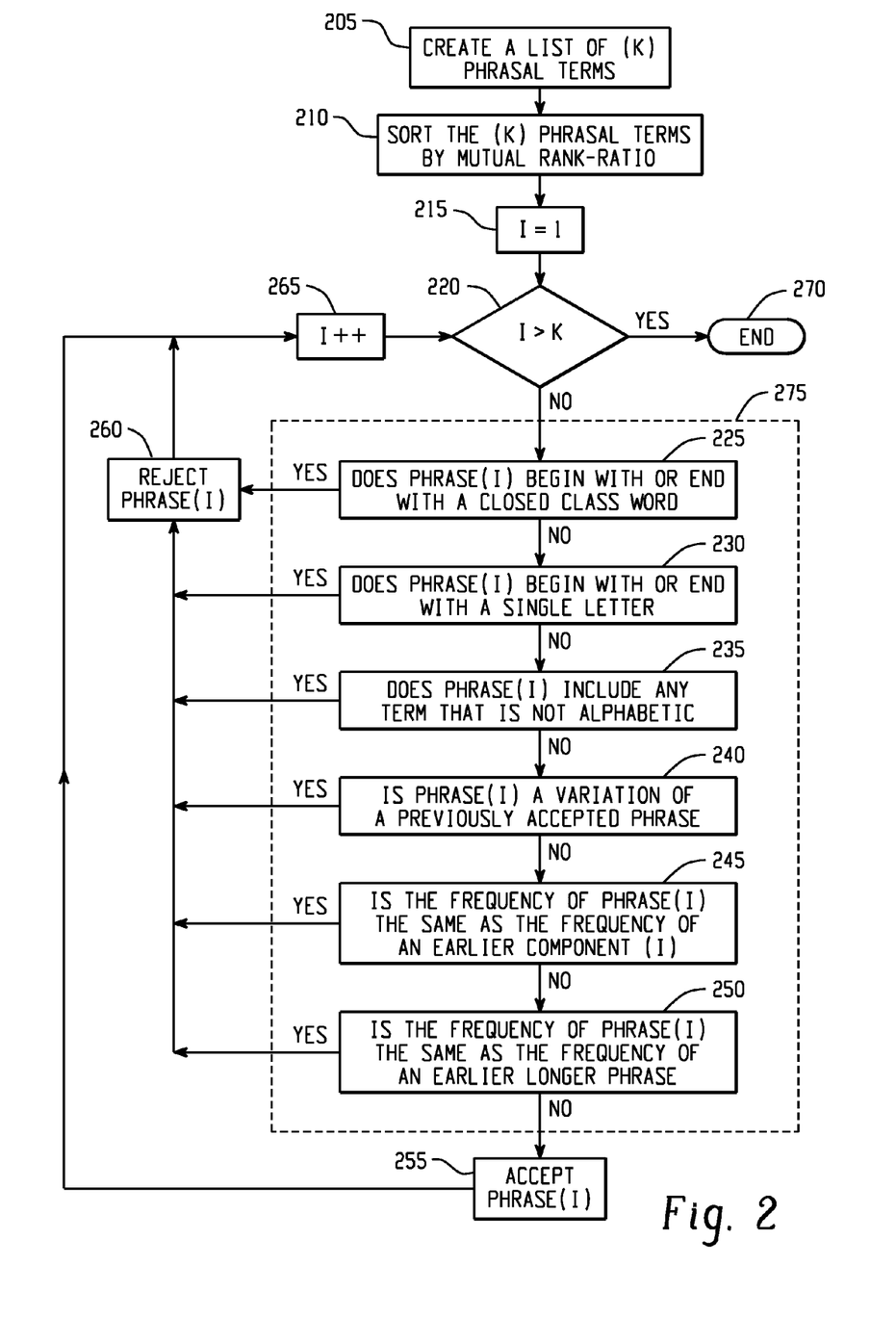
FIG. 2 is a flow diagram illustrating another example of a method for recognizing phrasal terms.

FIG. 2 is a flow diagram illustrating another example of a method for recognizing phrasal terms. As shown in FIG. 2, a list of (K) phrasal terms may initially be created 205. For example, the list of phrasal terms may be created by simply combining adjacent terms from a corpus of written materials. In some examples, the corpus of written materials may be in English and/or in a language other than English. The phrasal terms may be limited to bigrams or may include phrasal terms with 3, 4, 5, or 6 terms. In further examples, the phrasal term may be formed by combining more than 6 terms. After the list of phrasal terms is created 205, the (K) phrasal terms are sorted 210. For example, the phrasal terms may be sorted by frequency of occurrence or according to a statistical model. For example, the process may identify and/or rank phrasal terms with relatively high frequencies (e.g., numerous occurrences of a phrasal term in a corpus of written materials) and/or relatively low frequencies (e.g., fewer than 10 or fewer than 5, or fewer than 2 occurrences of a phrasal term in a corpus of written materials). For example, the statistical model may be the use of a mutual rank ratio.

A variety of association measures can been used for recognizing phrasal terms. For example, mutual information is one of the most common. Significance tests such as t-test, and log-likelihood may be used to establish threshold cutoffs. One of the drawbacks of some of these measures is that they may assume a normal distribution. However, vocabulary may be distributed according to a power law (e.g., a Zipfian frequency distribution). Such a distribution is highly skewed with a large number of rare events. This creates a distribution characteristic known as a "long tail." The "long tail" is even longer and the initial drop-off even sharper in the case of phrases. Although, this may not be the most important consideration except at the lowest frequency levels, a more important issue is that the statistical and information-theoretic metrics measure significance or informativeness relative to the assumption that the selection of component words is statistically independent. For phrasal terms this assumption is incorrect.

Mutual rank ratio is a statistical method that is specifically designed to address this incorrect assumption. Mutual rank ratio is based on ranking phrases based on how well a particular candidate compares with other phrases that share component words. It is a nonparametric method, and it has the advantage of uniform treatment for differently sized phrasal terms. Many of the standard association measures are only defined for bigrams, and do not generalize well to phrases of varying length. The basic concept of mutual rank ratio is to determine if a particular phrasal term should be ranked higher by comparing it with its competition. For example, the phrasal term "hot dog" may exist with other similar terms such as "hot stove," "hot date," "hot salsa," "hot fire," "hot oven," and "hot day." The phrasal term "hot dog" may by ranked more highly if it occurs more frequently than other terms that share the same components words—i.e., "hot ________" and/or "________ dog."

Although not shown in FIG. 2, the ranking may also rely on linguistic support to reduce duplication of phrasal terms and to distinguish different confidence levels for identified and accepted phrasal terms. For example, linguistic support may be used to filter candidate phrasal terms that are improbable. It may also be used for different types of heuristic support. Phrases that have been tentatively accepted can be divided into phrases that have linguistic support and those that do not. Phrases with support can be treated as phrases for which there is a greater confidence that the phrase is lexical. Additionally, the more sources of support a particular candidate phrase has, the greater the degree of confidence may be. Accordingly, redundant phrases may be filtered out and the phrases that are tentatively accepted may be divided into those that have linguistic support and those that do not. Candidate phrases may be routed for human judgment on the basis for how confident the system is that the phrase is lexical.

Once the (K) phrasal terms are ranked 210, the phrasal terms may be individually examined to determine 275 whether to accept or reject the phrasal term tentatively identified earlier 205. For example, as illustrated in FIG. 2, the process may implement a loop logic (e.g., a for loop, a while loop, or an if loop) 215, 220, 265. In particular, the loop logic may initiate a variable (I) to an initial value (1) 215 and then for as long as (I) is less than or equal to (K), sequentially examine the (I)th phrasal term. After the (I)th phrasal term is examined the phrasal term is either accepted 255 or rejected 260 and (I) is incremented 265 so the next phrasal term can be examined.

The examination of the phrasal term to determine whether to accept or reject the phrasal term may be based on one or more predetermined criteria. Some examples of such criteria are illustrated in FIG. 2. For example, the process may examine whether the phrasal term, phrase(I), begins with or ends with a closed class word 225. Phrase(I) may be rejected if it does begin with or end with a closed class word. Closed class words may be words that are predetermined to result in a phrase that should be rejected. For example, the word "the" may be a closed class word. Accordingly, any phrasal term that begins with or ends with the term "the" may be rejected 260.

If the phrasal term has not been previously rejected, the process may examine whether the phrasal term, phrase(I), begins with or ends with a single letter word 230. Phrase(I) may be rejected if it does begin with or end with a single letter word. For example, the word "a" is an example of a single letter word. Accordingly, any phrasal term that begins with or ends with the term "a" may be rejected 260.

If the phrasal term has not been previously rejected, the process may examine whether the phrasal term, phrase(I), includes a non-alphabetic term 235. Phrase(I) may be rejected if it does contain such a term. For example, non-alphabetic terms may be numbers or other symbols. Accordingly, any phrasal term that includes a number may be rejected 260. However, in some examples, certain symbols such as hyphens or apostrophes may be ignored such that phrasal terms that include such symbols are not rejected solely because they include these ignored (or excluded) symbols.

If the phrasal term has not been previously rejected, the process may examine whether the phrasal term, phrase(I), is a variation of a previously accepted phrasal term 240. Phrase (I) may be rejected if it is a variation of a previously accepted phrasal term. Variations of phrasal terms may include, for example, plural forms, hyphenated forms, and closed compound forms. Accordingly, if "hot dog" was already accepted, "hot dogs" may be rejected since it is a plural form.

If the phrasal term has not been previously rejected, the process may examine whether a previously accepted phrasal term is a component of the phrasal term, phrase(I) 245. Phrase (I) replaces an earlier accepted phrasal term if the earlier phrasal term is determined to be a component of phrase(I). For example, to determine whether a previously accepted phrasal term is a component of phrase(I), the process may determine whether the frequency of the previously accepted phrasal term and phrase(I) are the same. If they are the same, the process may conclude that the previously accepted phrasal term is a component of phrase(I). For example, if phrase(I) is "osama bin laden" it may be compared to an earlier accepted phrasal terms "osama bin" and "bin laden". Based on the analysis, the process may determine that the frequency of "osama bin" and phrase(I) are the same but that "bin laden" occurs more frequently than phrase(I). This may be the case since it is unlikely that "osama bin" is used unless it is in the larger phrasal term "osama bin laden". Accordingly, the component "osama bin" may be replaced with phrase(I). However, the component "bin laden" might be used as part of the larger phrasal term and on its own. Accordingly, the component "bin laden" and phrase(I) are maintained as phrasal terms.

Similarly, if the phrasal term has not been previously rejected, the process may examine whether the phrasal term, phrase(I) is component of a previously accepted phrasal term 250. Phrase(I) is rejected if it is a component of an earlier accepted phrasal term. For example, to determine whether phrase(I) is a component of a previously accepted phrasal term, the process may determine whether the frequency of the previously accepted phrasal term and phrase(I) are the same. If they are the same, the process may conclude that phrase(I) is a component of the previously accepted phrasal term. For example, if phrase(I) is "osama bin" it may be compared to an earlier accepted phrasal terms "osama bin laden". Based on the analysis, the process may determine that the frequency of "osama bin laden" and phrase(I) are the same. This may be the case since it is unlikely that "osama bin" is used unless it is in the larger phrasal term "osama bin laden". Accordingly, phrase(I) can be rejected. However, if the frequency of the previously accepted phrasal term and phrase(I) are different, both phrasal terms may be accepted.

Although FIG. 2 illustrates examples of a process in which a single criteria can cause a phrasal term to be rejected, in another example the process may be configured to require multiple criteria to be satisfied before a phrasal term is rejected. For example, the process may not reject a phrasal term because it begins with or ends with a closed class word but it may reject a phrasal term if it is not of the form: verb closed-class word. This may allow phrasal verbs such as "comb through" or "wrap up" to be retained.

Figure 3A:
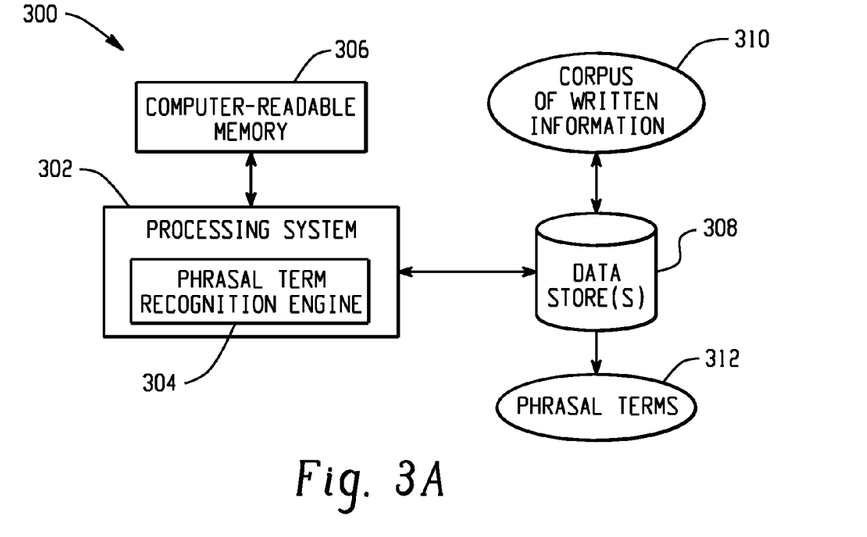
FIGS. 3A, 3B, and 3C are block diagrams illustrating an example systems for use in recognizing phrasal terms.
Figure 3B:
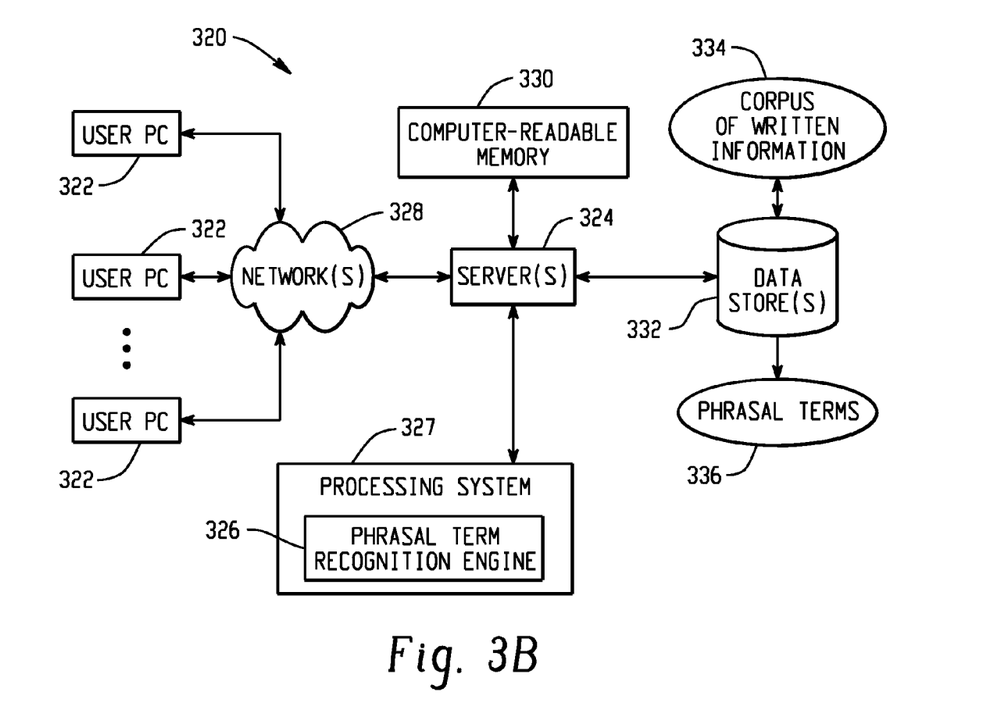
Figure 3C:
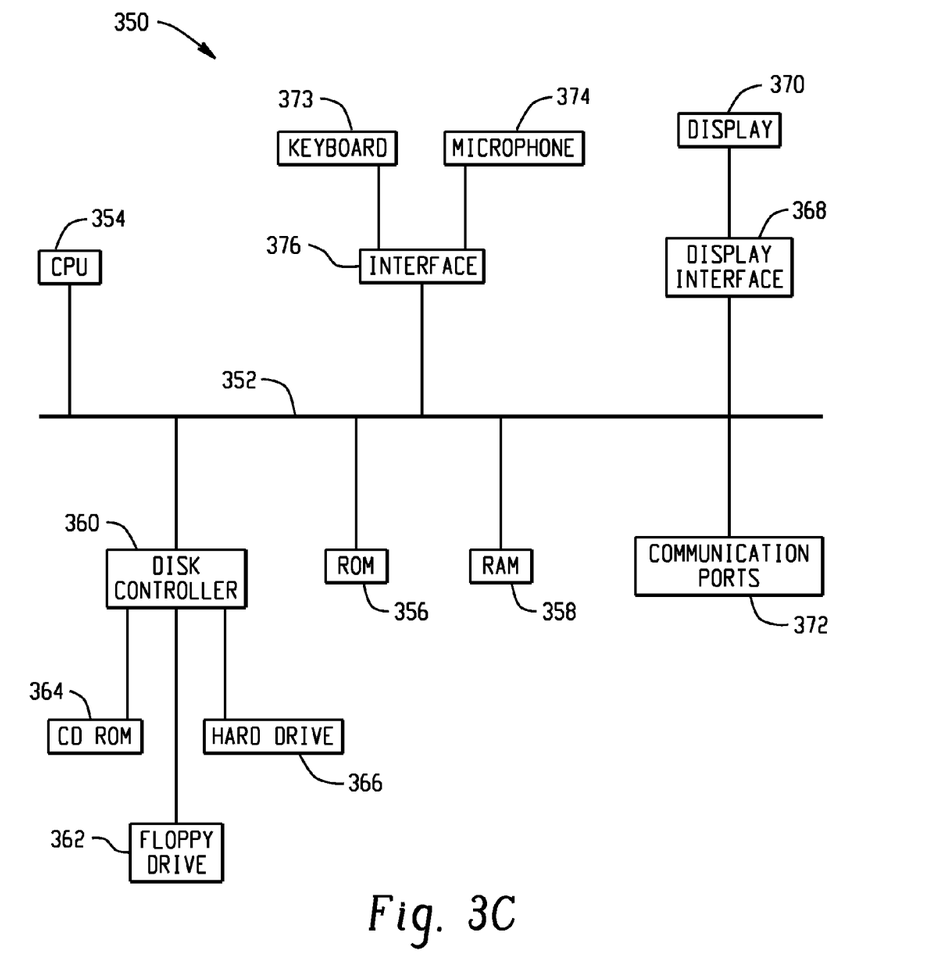

Examples have been used to describe the invention herein and the scope of the invention may include other examples. FIGS. 3A, 3B, and 3C depict example systems for use in implementing recognition of phrasal terms. For example, FIG. 3A illustrates an exemplary system 300 that includes a standalone computer architecture where a processing system 302 (e.g., one or more computer processors located in a given computer or in multiple computers that may be separate and distinct from one another) includes a phrasal term recognition engine 304 being executed on it. The processing system 302 has access to at least one computer-readable memory 306 in addition to one or more data stores 308. The one or more data stores 308 may include a corpus of written information 310 as well as a list of phrasal terms 312.

FIG. 3B depicts a system 320 that includes a client server architecture. One or more user PCs 322 access one or more servers 324 running a part of phrasal term recognition engine 326 on a processing system 327 via one or more networks 328. The one or more servers 324 may access a computer readable memory 330 as well as one or more data stores 332. The one or more data stores 332 may contain a corpus of written information 334 as well as a list of phrasal terms 336.

FIG. 3C shows a block diagram of exemplary hardware for a standalone computer architecture 350, such as the architecture depicted in FIG. 3A that may be used to contain and/or implement the program instructions of system embodiments of the present invention. A bus 352 may serve as the information highway interconnecting the other illustrated components of the hardware. A processing system 354 labeled CPU (central processing unit) (e.g., one or more computer processors at a given computer or at multiple computers), may perform calculations and logic operations required to execute a program. A non-transitory processor-readable storage medium, such as read only memory (ROM) 356 and random access memory (RAM) 358, may be in communication with the processing system 354 and may contain one or more programming instructions for performing the method of implementing a part of speech pattern scoring engine. Optionally, program instructions may be stored on a non-transitory computer readable storage medium such as a magnetic disk, optical disk, recordable memory device, flash memory, or other physical storage medium.

A disk controller 360 interfaces one or more optional disk drives to the system bus 352. These disk drives may be external or internal floppy disk drives such as 362, external or internal CD-ROM, CD-R, CD-RW or DVD drives such as 364, or external or internal hard drives 366. These various disk drives and disk controllers may be optional devices.

Each of the element managers, real-time data buffer, conveyors, file input processor, database index shared access memory loader, reference data buffer and data managers may include a software application stored in one or more of the disk drives connected to the disk controller 360, the ROM 356 and/or the RAM 358. The processor 354 may access each component as required.

A display interface 368 may permit information from the bus 352 to be displayed on a display 370 in audio, graphic, or alphanumeric format. Communication with external devices may optionally occur using various communication ports 372.

In addition to the standard computer-type components, the hardware may also include data input devices, such as a keyboard 373, or other input device 374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While this document uses examples to disclose the inventions described herein, it will be obvious to those skilled in the art that patentable scope of the invention may include other examples as well. It is intended that the following claims define the scope of the invention and that methods and structures within the scope of these claims and their equivalents be covered thereby.

What is claimed is:

1. A computer implemented method for using recognized phrasal terms to automatically determine meaning of a string of text where that determined meaning differs from a meaning of component words of the string of text in a computer system, the method comprising:
    identifying, using a computer processing system, a plurality of phrasal terms from a corpus of written materials;
    ranking, using the computer processing system, the plurality of phrasal terms;
    selecting, using the computer processing system, each of the plurality of phrasal terms sequentially based on the raking; and
    for each selected phrasal term, determining, using the computer processing system, whether to accept or reject the selected phrasal term based on:
        i. rejecting the selected phrasal term if any term within the selected phrasal term is non-alphabetic, unless the term is non-alphabetic as a result of a hyphen or apostrophe;
        ii. rejecting the selected phrasal term if the selected phrasal term is a variation of a previously accepted phrasal term, wherein the variation is a plural form, a hyphenated form, or a closed compound form;
        iii. replacing a previously accepted phrasal term with the selected phrasal term if the previously accepted phrasal term is a component of the selected phrasal term and the frequency of the previously accepted phrasal term and the frequency of the selected phrasal term are the same; and
        iv. rejecting the selected phrasal term if the selected phrasal term is a component of a previously accepted phrasal term and the frequency of the previously accepted phrasal term and the frequency of the selected phrasal term are the same;
    using a list of remaining phrasal terms to automatically determine a meaning of a received string of text using the computer processing system, where that determined meaning differs from a meaning of component words of the string of text.

2. The method of claim 1, wherein if the frequency of the previously accepted phrasal term and the selected phrasal term are different, both phrasal terms are accepted.

3. The method of claim 1, wherein the ranking is based on a statistical model.

4. The method of claim 3, wherein the statistical model is mutual rank ratio.

5. The method of claim 3, wherein the ranking further comprises linguistic support to reduce duplication of phrasal terms and to distinguish different confidence levels for identified and accepted phrasal terms.

6. The method of claim 1, wherein the plurality of phrasal terms comprises one or more of: a compound noun, a technical term, a phrasal verb, a named entity, an idiomatic phrase, and a fixed collocation.

7. The method claim 1, wherein the method identifies phrasal terms with relatively high and relatively low frequencies.

8. The method of claim 1, wherein the corpus of written materials are in English.

9. The method of claim 1, wherein the corpus of materials are in a language other than English.

10. The method of claim 1, wherein the plurality of phrasal terms comprises bigrams.

11. The method of claim 1, wherein the plurality of phrasal terms comprises n-grams of length 2, 3, and 4.

12. The method of claim 1, wherein the plurality of phrasal terms comprises n-grams of length 6 or less.

13. A computer implemented system for using recognized phrasal terms to automatically determine meaning of a string of text where that determined meaning differs from a meaning of component words of the string of text in a computer system, the system comprising:
   one or more data processors; and
   one or more computer readable mediums encoded with instructions for commanding the one or more data processors to execute a method comprising:
      identifying a plurality of phrasal terms from a corpus of written materials;
      ranking the plurality of phrasal terms;
      selecting each of the plurality of phrasal terms sequentially based on the raking; and
      for each selected phrasal term, determining whether to accept or reject the selected phrasal term based on:
         i. rejecting the selected phrasal term if any term within the selected phrasal term is non-alphabetic, unless the term is non-alphabetic as a result of a hyphen or apostrophe;
         ii. rejecting the selected phrasal term if the selected phrasal term is a variation of a previously accepted phrasal term, wherein the variation is a plural form, a hyphenated form, or a closed compound form;
         iii. replacing a previously accepted phrasal term with the selected phrasal term if the previously accepted phrasal term is a component of the selected phrasal term and the frequency of the previously accepted phrasal term and the frequency of the selected phrasal term are the same; and
         iv. rejecting the selected phrasal term if the selected phrasal term is a component of a previously accepted phrasal term and the frequency of the previously accepted phrasal term and the frequency of the selected phrasal term are the same
      using a list of remaining phrasal terms to automatically determine a meaning of a received string of text using the computer processing system, where that determined meaning differs from a meaning of component words of the string of text.

14. The system of claim 13, wherein if the frequency of the previously accepted phrasal term and the selected phrasal term are different, both phrasal terms are accepted.

15. The system of claim 13, wherein the ranking is based on a statistical model.

16. The system of claim 15, wherein the statistical model is mutual rank ratio.

17. The system of claim 13, wherein the plurality of phrasal terms comprises one or more of: a compound noun, a technical term, a phrasal verb, a named entity, an idiomatic phrase, and a fixed collocation.

18. A computer-readable medium encoded with instructions for commanding a processing system to execute a method for using the recognized phrasal terms to automatically determine meaning of a string of text where that determined meaning differs from a meaning of component words of the string of text in a computer system, the method comprising:
   identifying a plurality of phrasal terms from a corpus of written materials;
   ranking the plurality of phrasal terms;
   selecting each of the plurality of phrasal terms sequentially based on the raking; and
   for each selected phrasal term, determining whether to accept or reject the selected phrasal term based on:
      i. rejecting the selected phrasal term if any term within the selected phrasal term is non-alphabetic, unless the term is non-alphabetic as a result of a hyphen or apostrophe;
      ii. rejecting the selected phrasal term if the selected phrasal term is a variation of a previously accepted phrasal term, wherein the variation is a plural form, a hyphenated form, or a closed compound form;
      iii. replacing a previously accepted phrasal term with the selected phrasal term if the previously accepted phrasal term is a component of the selected phrasal term and the frequency of the previously accepted phrasal term and the frequency of the selected phrasal term are the same; and
      iv. rejecting the selected phrasal term if the selected phrasal term is a component of a previously accepted phrasal term and the frequency of the previously accepted phrasal term and the frequency of the selected phrasal term are the same;
   using a list of remaining phrasal terms to automatically determine a meaning of a received string of text using the computer processing system, where that determined meaning differs from a meaning of component words of the string of text.

* * * * *